United States Patent [19]

Cheng

[11] Patent Number: 5,018,754
[45] Date of Patent: May 28, 1991

[54] FRONT SEAT REVERSING STRUCTURE FOR DUAL-SEAT BABY STROLLER

[75] Inventor: Kenny Cheng, Tao Yuan Hsien, Taiwan

[73] Assignee: Joanna A. Nichols, Hemet, Calif.

[21] Appl. No.: 490,142

[22] Filed: Mar. 7, 1990

[51] Int. Cl.⁵ .............................................. B62B 7/08
[52] U.S. Cl. .................................. 280/47.4; 280/643; 280/644; 280/648; 297/355
[58] Field of Search .............. 280/642, 643, 644, 647, 280/648, 650, 658, 47.38, 47.39, 47.4; 297/355, 358, 369, 373

[56] References Cited

U.S. PATENT DOCUMENTS

| | | | |
|---|---|---|---|
| 2,798,730 | 7/1957 | Smith | 280/47.4 X |
| 3,248,125 | 4/1966 | Gill | 280/643 X |
| 4,435,012 | 3/1984 | Kassai | 280/643 X |
| 4,834,415 | 5/1989 | Yee | 280/648 X |
| 4,858,947 | 8/1989 | Yee et al. | 280/643 |

*Primary Examiner*—Andres Kashnikow
*Assistant Examiner*—Michael Mar
*Attorney, Agent, or Firm*—Ladas & Parry

[57] ABSTRACT

The present invention relates to a front seat reversing structure for a dual-seat baby stroller comprising a reversing lever, a locating bar, switching elements, links, arms, and a handlebar wherein the reversing lever is secured to the locating bar, the ends of the locating bar being passed through the guide slots on the ends of the seat-back frame, the seat-back frame being pivoted to the switching elements which are secured to the links, the handlebar being able to slide over the upper side-bar and an engaging element being rotatably pinned to one side of the upper-bar so as to retain the handlebar. Direction changing can be effected by pulling the reversing lever and the seat-back frame such that the position of the locating bar is changed to the opposite side of the switching elements, in connection with the arms being caused to swing by the links. When an engaging element is pressed and the handle is pulled to extend forward, the usable space of the baby stroller can be expanded.

2 Claims, 8 Drawing Sheets

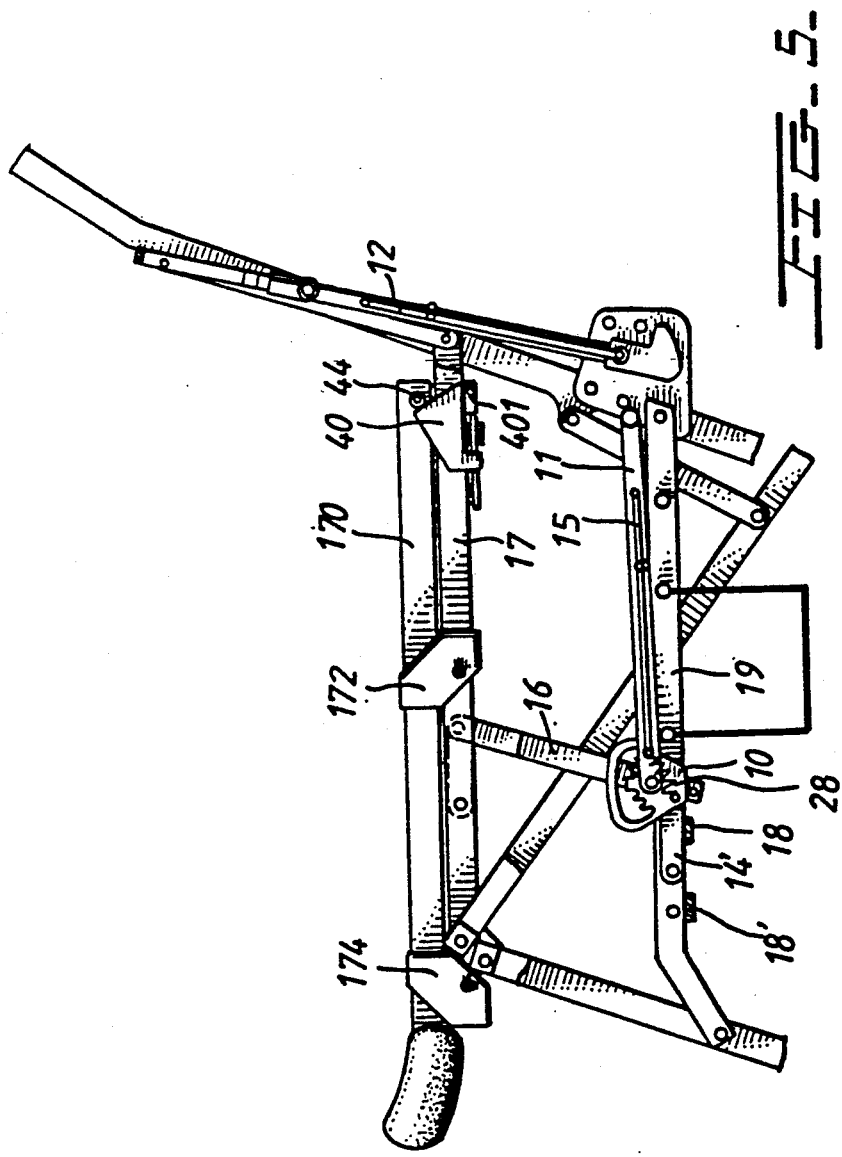

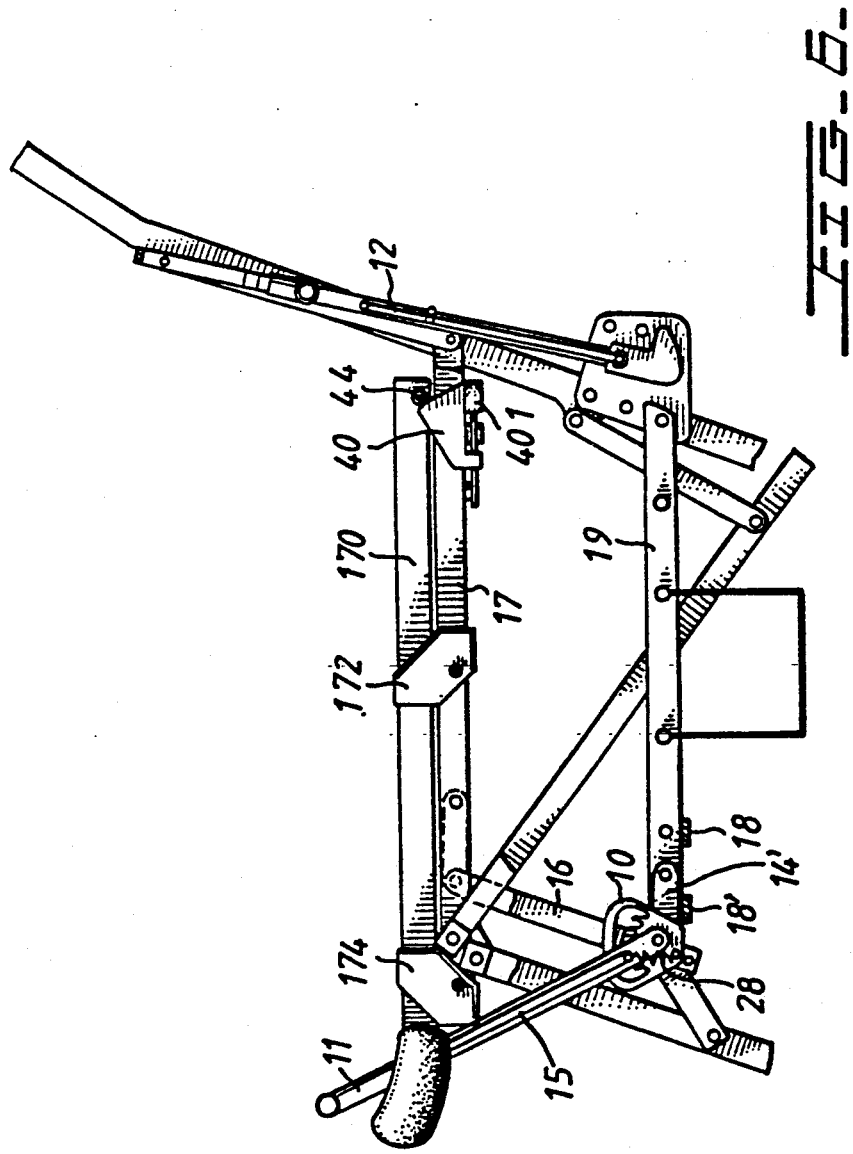

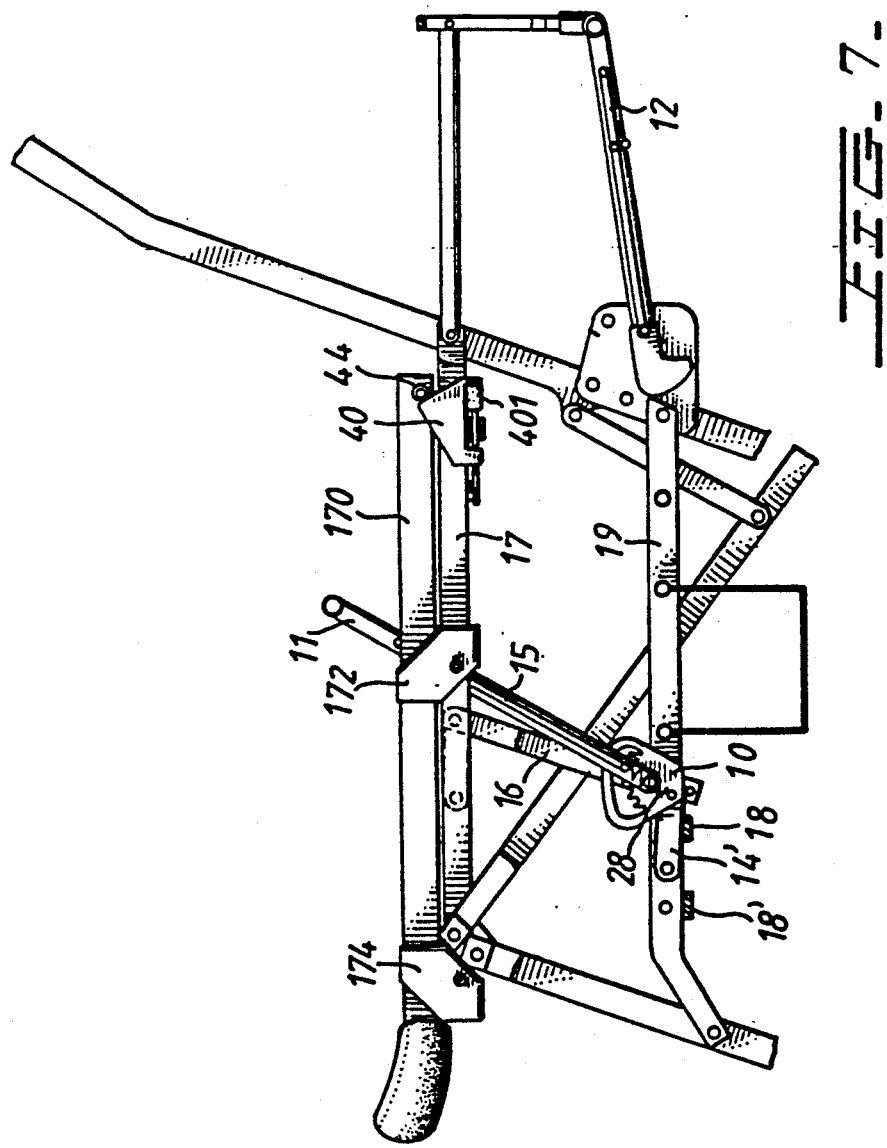

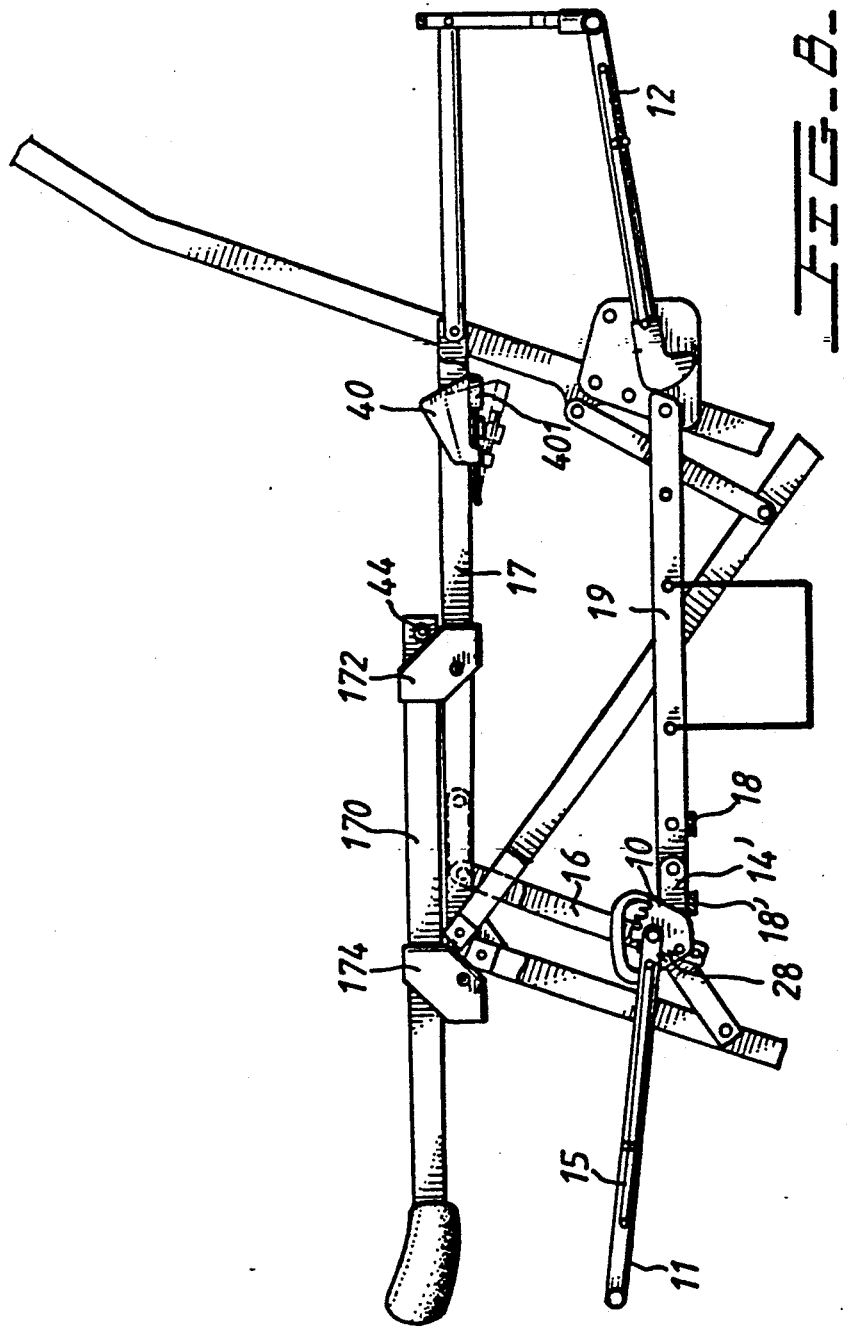

FRONT SEAT REVERSING STRUCTURE FOR DUAL-SEAT BABY STROLLER

BACKGROUND OF THE INVENTION

The present invention relates to a front seat reversing structure for a dual-seat baby stroller, in particular, to changing the direction and position of the front seat by using a reversing structure and by pulling the reversing lever, causing the links to move, and in connection with a handlebar which can be extended forward.

Conventional dual-seat baby strollers have a fixed front seat such that a child in the front seat always faces forward. Further, the space available in the baby stroller is limited because of such a fixed front seat.

SUMMARY OF THE INVENTION

It is an object of the present invention to provide a reversing structure for a dual-seat baby stroller, wherein the direction of the front seat can be changed by operating a reversing lever in connection with the switching elements.

Another object of the present invention is to provide a reversing structure for a dual-seat baby stroller, wherein the usable space within the stroller can be expended.

A further object of the present invention is to provide a reversing structure for a dual-seat baby stroller, wherein the structure is simple in construction and is easily operated.

These, and other objects and advantages of the present invention, will become more apparent from a consideration of the following detailed description of the preferred embodiments, when read in conjunction with the accompanying drawings.

BRIEF DESCRIPTION OF THE DRAWINGS

FIG. 5 is a schematic view illustrating the reversing lever being pulled into a horizontal position and the seat-back frame of the front seat being placed horizontally in accordance with the present invention;

FIG. 6 is a schematic view illustrating the seat-back frame being rotated to another position for completing the reversing of the seat direction in accordance with the present invention;

FIG. 7 is a schematic view illustrating the front seat being in a normal position in accordance with the present invention and in combination with an appropriate adaptation of the conventional back seat including arrangement being placed horizontally; and FIG. 8 is a schematic view illustrating the handlebar being pulled and the seat-back frame of the front seat being placed horizontally in accordance with the present invention and in conjunction with an appropriate adaptation of the conventional back seat inclining arrangement being placed horizontally.

DETAILED DESCRIPTION OF THE PRESENT INVENTION

Figure 1:
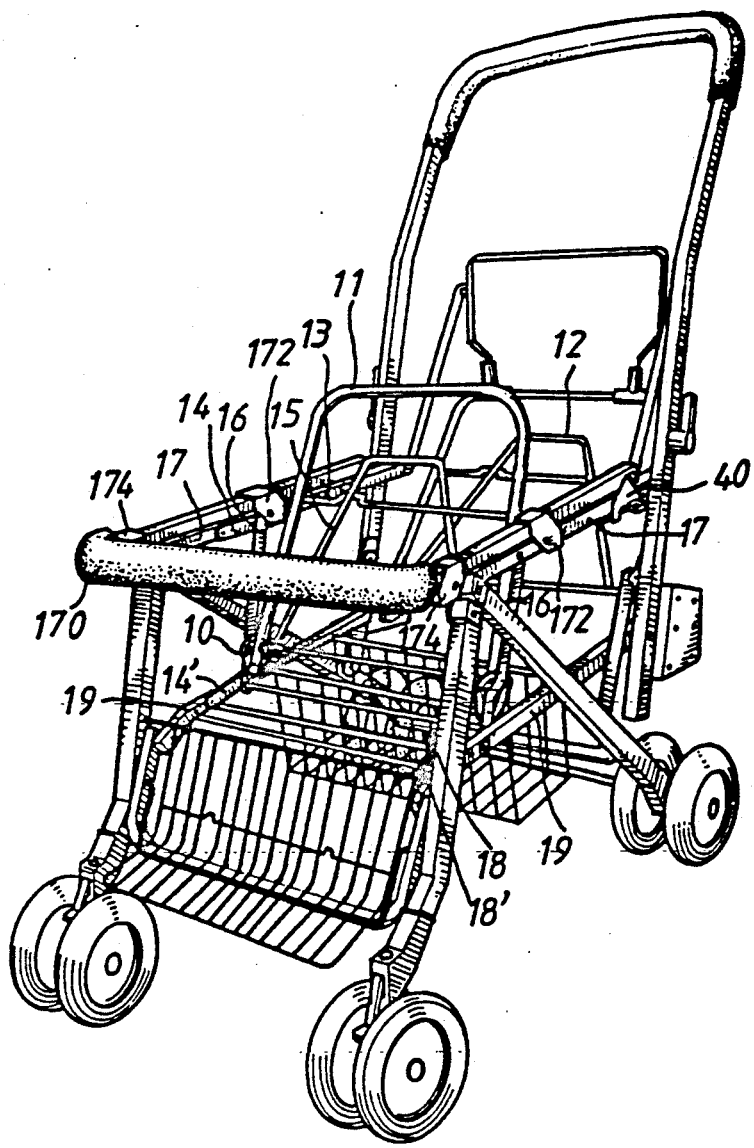
FIG. 1 is a perspective view of a stroller with the front seat reversing structure in accordance with the preferred embodiment of the present invention.
Figure 2:
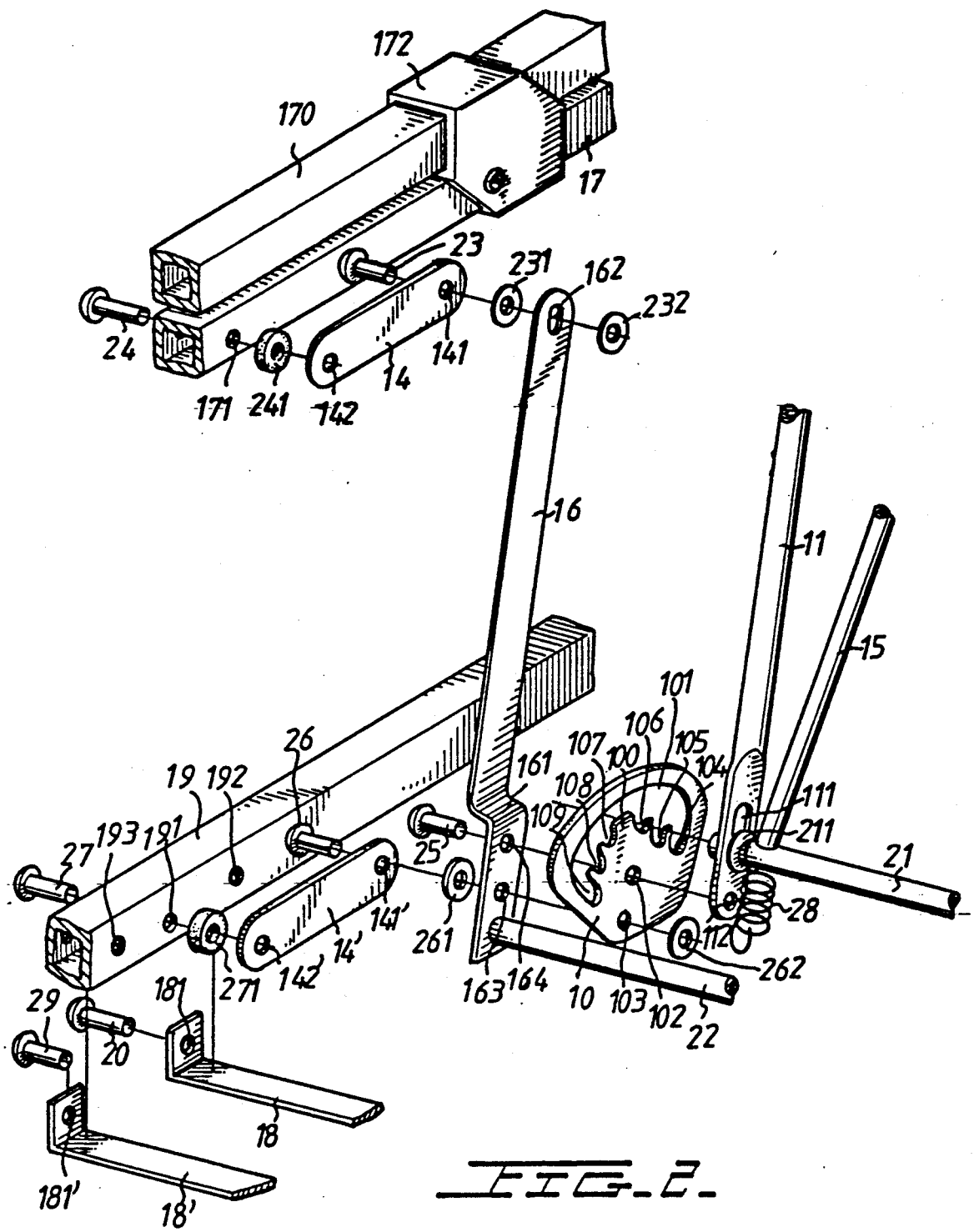
FIG. 2 is an exploded view illustrating component parts of the reversing structure in accordance with the present invention.
Figure 3:
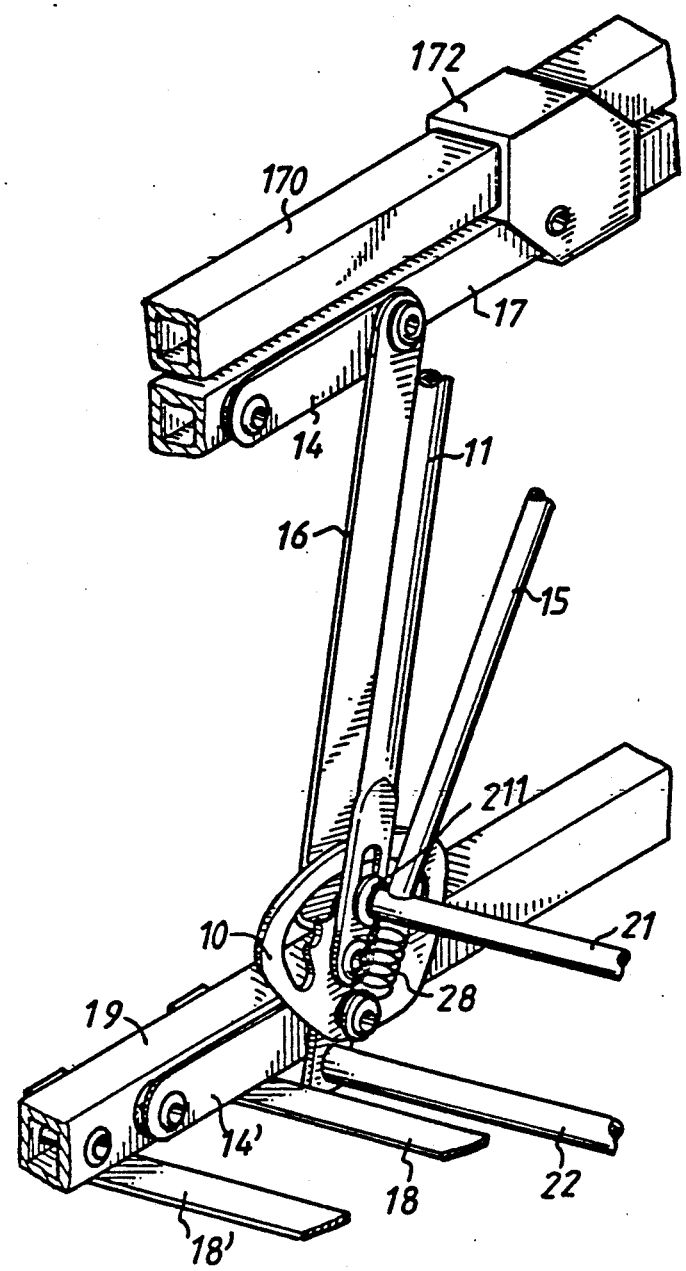
FIG. 3 is a view illustrating the reversing structure in an assembled position in accordance with the present invention.

As shown in FIGS. 1 through 3, a front seat reversing structure for dual-seat baby stroller of the present invention has a reversing lever (15) which is bent into a trapezoidal shape, said reversing lever (15) straddling a support bar (13) which has a bend for facilitating the reversing lever (15) to ride over it, the ends of the support bar (13) being rotatably connected to both sides of a seat-back frame (11) so as to set the reversing lever (15) in position. Since the reversing structure is laterally symmetrical, only one side thereof will be described. One end of the reversing lever (15) is securely connected to a locating bar (21) and one end of the locating bar (21) passes successively through a washer (211), a guide slot (111) on the seat-back frame (11), and a guide groove (101) on the switching element (10). The front end of the seat-back frame (11) is flat and provided with said guide slot (111) and a hole (112). The switching element (10) is substantially a plate sector element with a guide groove (101) provided along the arched portion thereof, grooved holes (104 to 109) being provided on the lower edge of the guide groove (101), said grooved holes being separated into two portions by a horizontal projection (100) provided in the center, a pair of holes (102,103) being further provided at positions relative to the guide groove (101). A link (16) has one end securely connected to a support bar (22) with a pair of upper and lower holes (164,163) provided adjacent to the connection and the other end provided with a guide slot (162). Said link (16) is formed with a bend (161) adjacent to the hole (164) such that the extended end of the locating bar (21) is free to swing. A pair of arms (14,14'), each has both ends provided with holes (141,142 and 141',142'), respectively. The arm (14) is rotatably pinned to the upper side-bar (17) by means of a rivet (24) passing successively through a hole (171) on the upper side-bar (17), a washer (241), and then through the hole (142) on the arm (14). A rivet (23) passes first through the other hole (141) on the arm (14), then through a washer (231), the guide slot (162) on the link (16), and another washer (232), such that the link (16) and the arm (14) are rotatably connected. The arm (14') is rotatably pinned to the lower side-bar (19) by means of a rivet (27) passing successively through a hole (191) on the lower side-bar (19), a o washer (271), and then through the hole (142') on the arm (14'). A rivet (26) passes through the hole (141') on the arm (14'), a washer (261), the hole (163) on the link (16), the hole (103) on the switching element (10), and another washer (262) to connect all the components. Another rivet (25) passes through the other hole (164) on the link (16), then through the other hole (102) on the switching element (10), and the hole (112) on the seat-back frame (11) to connect all the components. The switching element (10) and the link (16) are penetrated with different rivets (25,26) such that they can be securely connected. A spring (28) has one end hooked on the locating bar (21) between the reversing lever (15) and a washer (211), and its other end hooked at the rivet (26) between the washer (262) and the switching element (10). A pair of retaining bars (18,18') with their ends bent perpendicularly and each bar being provided with a hole (181,181') are securely connected at the side of holes (192,193) on the lower side-bar (19) by means of rivets (20,29), respectively, so as to limit the swinging range of the link (14').

When the reversing lever (15) is pulled, since the locating bar (21) is secured thereto, it will be pulled along the guide slot (111) on the seat-back frame (11) and away from the grooved holes on the switching element (10) such that the position of the locating bar (21) in the grooved holes on the switching element (10) can be shifted as desired by swinging the seat-back frame (11), and then the locating bar (15) is released so as to be engaged into a grooved hole on the switching element (10) by the resiliency of the spring (28). It is to be noted that the grooved holes on the switching element (10) are designed such that the locating bar (21) in the grooved holes can only slide toward horizontal projection (100) in the center, and to pass said projection (100), said locating bar (21) must be lifted. In this way, it is not necessary to pull the reversing lever (15) which can be quickly shifted from a horizontal position to another position by only pulling the seat-back frame (11). If both the reversing lever (15) and the seat-back frame (11) are pulled, the arm (14') can be pulled and the arm (14) can also be pulled at the same time through the connection of the link (16). The swinging range of the arm (14') is limited by the retaining bars (18,18') secured to the lower side-bar (19).

Figure 4:
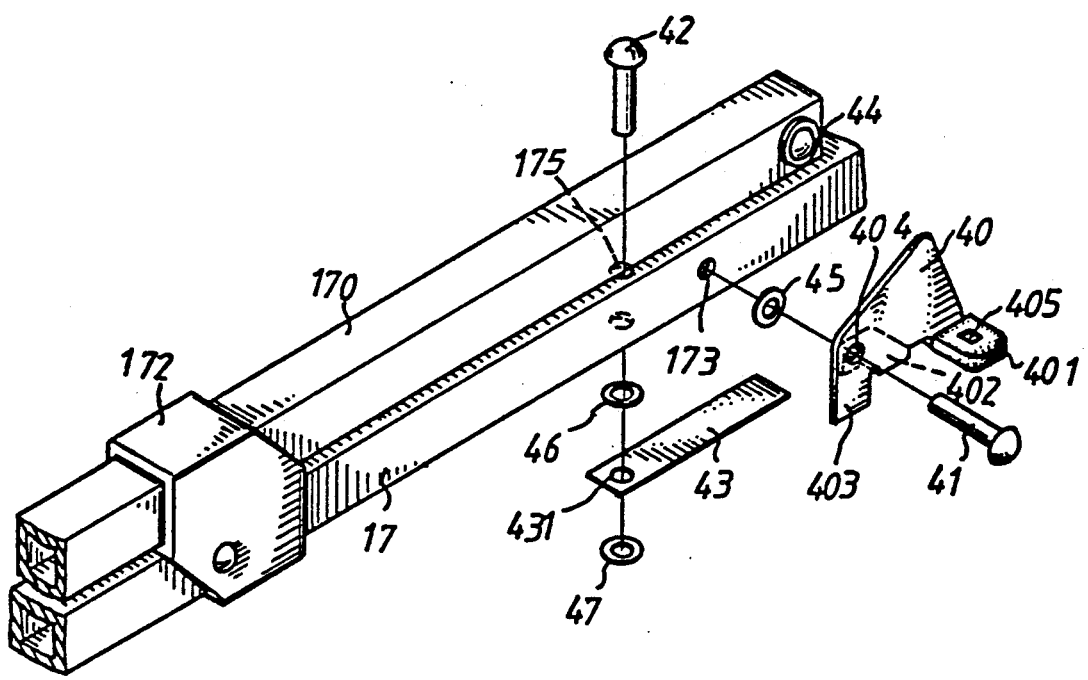
FIG. 4 is an exploded view illustrating the elements of the engaging portion on the upper side-bar and the handlebar in accordance with the present invention.

Referring to FIGS. 1 and 4, a handlebar (170) is bent forward and sloped up slightly (shown only in FIG. 1), the two sides thereof both being fitted over the upper side-bar (17) by means of receiving members (172,174), with the connections where they are fitted located at the center and the front end, respectively, such that the handlebar (170) can slide on the upper side-bar (17). The handlebar (170) is provided at its end with a projected pin (44) (only one side shown in FIG. 4) such that the handlebar (170) can be extended forward until the projected pin (44) touches the receiving member (172), and upon touching the receiving member (174), the bent portion of the handlebar (170) will limit the length which the handlebar (170) can be withdrawn. An engaging element (40) is substantially an irregular guadrilateral plate body which is provided thereon with a hole (404) and rotatably pinned to a side of the upper side-bar (17) by means of a rivet (41) passing through said hole (404) and then successively through a washer (45) and the hole (173) on the upper side-bar (17). Said engaging element (40) is arranged at a position such that upon withdrawing the handlebar (170), one corner of the engaging element (40) is allowed to touch against the projected pin (44) on the handlebar (170). A lug (401) is mounted perpendicularly to one side of said engaging element (40), said lug (401) having a recess (405) on one surface for facilitating the holding and actuation of the engaging element (40). An extended end (403) is provided adjacent to the hole (404) on the engaging element (40) and coplanar with said engaging element (40). A further extended end (402) is provided beside and perpendicular to the extended end (403), the front edge of the extended end (402) being bent down and parallel to the plane where the engaging element (40) is located. A leaf spring (43) has one end provided with a hole (431) such that the leaf spring (43) is secured to the lower edge of the upper side-bar (17) by means of a rivet (42) passing vertically through a hole (175), and then through a washer (46), said hole (431) and a washer (47). The other end of the leaf spring (43) extends beneath the extended end (402) of the engaging element (40) and is attached to the bottom portion thereof. The leaf spring (43) is prevented from shifting by the blocking effect of the extended end (402) and the downwardly bent front edge of the extended end (403) of the engaging element (40). When the engaging element (40) is in the normal position, the upper edge becomes inclined forward and the projected pin (44) of the handlebar (170) can be engaged by said upper edge at its peak. When the lug (401) of the engaging element (40) is pressed, it causes the projected pin (44) of the handlebar (170) to become disengaged such that the handlebar (170) can be extended forward. When the handlebar (170) is withdrawn, the projected pin (44) first touches the upper edge of the engaging element (40), thus forcing the engaging element (40) to press down until the projected pin (44) of the handlebar (170) passes through the peak on the upper edge of the engaging element (40), and said engaging element (40) then bounces up due to the resiliency of the leaf spring (43), thereby engaging the projected pin (44) of the handlebar (170).

In FIGS. 5 through 8, there are shown embodiments of the present invention wherein the body of the baby stroller is seen partly cut away in a side view. As shown in FIG. 5, when the arm (14') is placed on the retaining bar (18) and the reversing lever (15) is pulled into a horizontal position, the reclined positioning of the front seat is thus completed. As shown in FIG. 6, when the seat-back frame (11) is pulled, the arm (14') is caused to rotate from the position where it is in contact with the retaining bar (18) to the position where the arm (14') is in contact with the retaining bar (18'), the reversing lever (15) is then pulled so as to place the locating bar (21) in an appropriate grooved hole on the switching element (10), thus completing the reversing of the seat direction so that children carried in the baby stroller can be seated face to face. As shown in FIG. 7, when the arm (14') touches the retaining bar (18), the seat-back frame (11) can be adjusted to be in an appropriate grooved hole on the switching element (10), thereby causing the front seat to face forward in conjunction with an appropriate adaptation of the conventional back seat inclining arrangement, that is, the back seat is inclined by pulling the lever (12). As shown in FIG. 8, when the lug (401) on the engaging element (40) is pressed, causing the projected pin (44) of the handlebar (170) to be out of the engaged position, the handlebar (170) can be pulled to extend forward until the projected pin (44) touches the receiving member (172), and then in conjunction with pulling the seat-back frame (11) and the reversing lever (15), it causes the seat-back frame (11) to incline forward into a substantially horizontal position, thus expanding the usable space of the front seat. By having said seat-back frame thus inclined in conjunction with an appropriate adaptation of the conventional back seat inclining arrangement, that is, the back seat is inclined by pulling the lever (12), the usable space within the baby stroller can be maximized.

While the invention has been described with a certain degree of particularity, it is manifest that many changes may be made in the details of construction and the arrangement of components without departing from the spirit and scope of this disclosure. It is understood that the invention is not limited to the exemplified embodiment set forth herein but is to be limited only by the scope of the attached claims, including the full range of equivalency to which each element thereof is entitled.

I claim:

1. A front seat reversing structure for a dual-seal baby stroller comprising:

a seat-back frame having a pair of opposed ends, each of the ends having a guide slot and a hole;

a pair of switching elements, each of said pair of elements being a substantially sector-shaped plate with a guide groove provided along an arched portion thereof, a plurality of grooved holes being provided along a lower edge of said guide groove, a horizontal projection provided in the center of said guide groove for separating said grooved holes into two portions, and a pair of holes being further provided in each of said pair of elements at a location below said guide groove;

a locating bar with opposed ends, each end passing through the guide slot of a respective end slot of said seat-back frame and the guide groove on a respective one of said switching elements such that when the ends of said locating bar is in the grooved holes, the bar can only slide toward said horizontal projection on the lower edge of the guide groove;

a reversing lever bent into a trapezoidal shape with a pair of lower ends, each of said ends being secured to the locating bar;

a pair of links, one end of each of the links having a guide slot and the other end thereof being provided with a pair of holes, a rivet passing through one of said holes, through one of said holes in said switching element, and then the hole in a respective end of said seat-back frame to connect them in such a way that said seat-back frame can be rotated relative to said element;

a support bar having opposite ends secured to the lower end of respective ones of said pair of links;

two pairs of arms, one arm of each of said pairs of arms being rotatably pinned at one end to a respective one of a pair of upper side-bars by a rivet and the other end thereof being rotatably pinned to the guide slot on a respective of one said pair of links by a rivet; the other arm of each of said pair of arms being rotatably pinned at one end to a respective lower side-bar by a rivet and the other end thereof being connected by a rivet passing through the other of said pair of holes in a respective one of said links and the other of said pair of holes in the respective one of said switching elements, respectively, such that the connected ends of the links are rotatable relative tot he arms;

a pair of springs, one end of each of said springs being hooked to the locating bar and the other end thereof being hooked to the rivet which passes through a respective one of said switching elements and said other arm; and a pair of retaining bars secured to the sides of each of said lower side bars adjacent respective ones of said other arms;

whereby the position of the locating bar in the grooved hole on the switching elements can be shifted by pulling the reversing lever in conjunction with pulling the seat-back frame, thus causing the arms to swing, the swinging range being limited by said retaining bars.

2. The reversing structure according to claim 1 further comprising:

a handlebar bent in the front portion, both sides thereof being able to slide over the upper side-bars, the ends of both sides being each provided with a projected pin;

an engaging element being a substantially irregular quadrilateral plate-shaped body and rotatably pinned to one side of the upper side-bar, a lug being mounted perpendicular to one side of said engaging element, a pair of extending ends which are vertical relative to each other being further provided adjacent to the pinning hole, one of the extended ends being coplanar with the engaging element and front edge of the other extended end being bent down such that the upper edge of the engaging element can engage the projected pin of the handlebar; and a leaf spring with one end secured to the lower edge of the upper side-bar by a rivet and the other end thereof extending into the extended end of the engaging element with the bent lower-edge and attaching to the bottom portion of said extended end;

wherein by pressing the lug of the engaging element for causing the projected pin on the handlebar to be out of the engaged position, the handlebar is allowed to be extended forward, and upon withdrawing the handlebar, the engaging element is allowed to be engaged on the projected pin of the handlebar by means of the resiliency of the leaf spring such that the usable space of the front seat can be changed by extending and withdrawing said handlebar.

* * * * *